(12) United States Patent
Im et al.

(10) Patent No.: US 8,420,245 B2
(45) Date of Patent: Apr. 16, 2013

(54) MIDDLE OR LARGE-SIZED BATTERY PACK CASE PROVIDING IMPROVED DISTRIBUTION UNIFORMITY OF COOLANT FLUX

(75) Inventors: Ye Hoon Im, Daejeon (KR); Dooseong Choi, Daejeon (KR); Jaesung Ahn, Daejeon (KR); Dal Mo Kang, Daejeon (KR); Sang Phil Han, Daejeon (KR); Jongmoon Yoon, Daejeon (KR); Heekook Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 456 days.

(21) Appl. No.: 12/664,135

(22) PCT Filed: Jun. 12, 2008
(Under 37 CFR 1.47)

(86) PCT No.: PCT/KR2008/003286
§ 371 (c)(1),
(2), (4) Date: Aug. 13, 2010

(87) PCT Pub. No.: WO2008/153328
PCT Pub. Date: Dec. 18, 2008

(65) Prior Publication Data
US 2011/0171512 A1 Jul. 14, 2011

(30) Foreign Application Priority Data
Jun. 14, 2007 (KR) .................. 10-2007-0058078

(51) Int. Cl.
*H01M 2/02* (2006.01)

(52) U.S. Cl.
USPC .......................................... 429/100; 429/120

(58) Field of Classification Search .................. 429/100, 429/120
See application file for complete search history.

(56) References Cited

U.S. PATENT DOCUMENTS

| 5,278,002 | A | * | 1/1994 | Hiers ............................. 429/175 |
| 6,953,638 | B2 | | 10/2005 | Inui et al. |
| 2006/0093901 | A1 | | 5/2006 | Lee et al. |
| 2006/0115716 | A1 | | 6/2006 | Kim et al. |
| 2010/0092848 | A1 | * | 4/2010 | Choi et al. ....................... 429/99 |
| 2010/0203376 | A1 | * | 8/2010 | Choi et al. ..................... 429/120 |

FOREIGN PATENT DOCUMENTS

| JP | 2001-283937 A | | 10/2001 |
| JP | 2003-308888 A | | 10/2003 |
| JP | 2005-302590 A | | 10/2005 |
| JP | 2005302590 A | * | 10/2005 |
| JP | 2006-127921 A | | 5/2006 |

(Continued)

*Primary Examiner* — Robert B Davis
(74) *Attorney, Agent, or Firm* — Birch, Stewart, Kolasch & Birch, LLP (57) ABSTRACT

Disclosed herein is a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the beads being constructed in an outwardly-protruding structure to allow the coolant to be uniformly introduced into the battery module from the coolant inlet port in the advancing direction of a fluid in a flow space ("inlet duct") defined between the coolant inlet port and the battery module.

17 Claims, 5 Drawing Sheets

FOREIGN PATENT DOCUMENTS

| | | |
|---|---|---|
| JP | 2006-128123 A | 5/2006 |
| JP | 2006-185788 A | 7/2006 |
| JP | 2006-324041 A | 11/2006 |
| KR | 10-2004-0031078 A | 4/2004 |

* cited by examiner

FIG. 1

Prior Art

FIG. 2

Prior Art

FIG. 3

< Flux distribution in channels between cells >

*Prior Art*

< Flux distribution in channels between cells >

MIDDLE OR LARGE-SIZED BATTERY PACK CASE PROVIDING IMPROVED DISTRIBUTION UNIFORMITY OF COOLANT FLUX

FIELD OF THE INVENTION

The present invention relates to a middle- or large-sized battery pack case, and, more particularly, to a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the beads being constructed in an outwardly-protruding structure to allow the coolant to be uniformly introduced into the battery module from the coolant inlet port in the advancing direction of a fluid in a flow space ("inlet duct") defined between the coolant inlet port and the battery module.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide power and capacity required by a predetermined apparatus or device, it is necessary for the middle- or large-sized battery module to be constructed in a structure in which a plurality of battery cells are electrically connected in series with each other, and the battery cells are stable against an external force.

Also, the battery cells constituting the middle- or large-sized battery module are secondary batteries which can be charged and discharged. Consequently, a large amount of heat is generated from the high-power, large-capacity secondary battery during the charge and discharge of the battery cells. If the heat, generated from the unit cells during the charge and discharge of the unit cells, is not effectively removed, the heat accumulates in the respective unit cells, and therefore, the deterioration of the unit cells is accelerated. According to circumstances, the unit cells may catch fire or explode. For this reason, a cooling system is needed in a battery pack for vehicles, which is a high-power, large-capacity battery.

Figure 1:
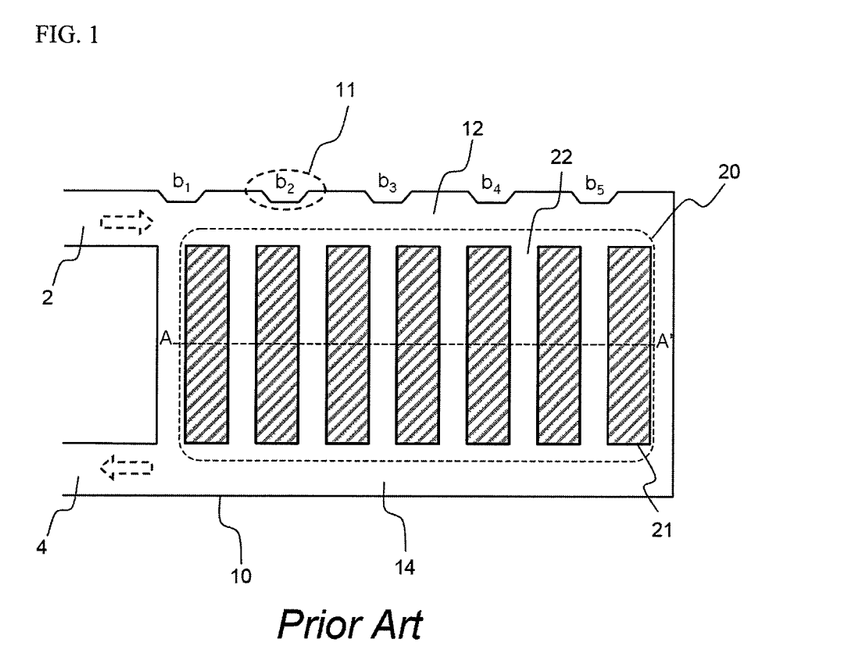
FIG. 1 is a sectional view typically illustrating a middle- or large-sized battery pack constructed in a structure in which a battery module is mounted in a conventional battery pack case having beads.

An example of the battery pack cooling system is illustrated in FIG. 1.

Referring to FIG. 1, the battery pack cooling system includes a battery module 20 constructed in a structure in which a plurality of battery cells 21 are electrically connected with each other and a battery pack case 10 in which the battery module 20 is mounted. At the battery pack case 10 are formed a coolant inlet port and a coolant outlet port, which are disposed such that a coolant can flow from one side to the other side of the battery module 20 in the direction perpendicular to the stacking direction of the battery cells 21. At the battery pack case 10 are also formed inwardly-protruding beads 11, which are arranged in a concavo-convex structure and protrude inwardly of the inlet duct 12 such that the battery pack case 10 exhibits excellent durability or structural stability against an external force, such as twist or vibration. The external shape of the inwardly-protruding beads 11 is clearly shown in FIG. 2, which is a partial perspective view illustrating the external appearance of the battery pack case 10.

Figure 2:
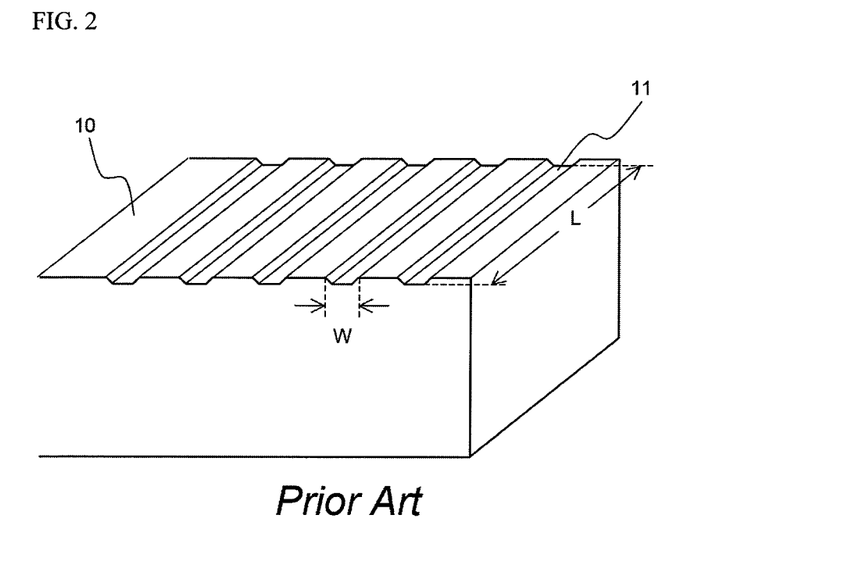
FIG. 2 is a perspective view illustrating the external appearance of the battery pack case of the middle- or large-sized battery pack shown in FIG. 1.

As shown in FIG. 2, the inwardly-protruding beads 11 are constructed in a concavo-convex structure having a large length (L) to width (W) ratio. The inwardly-protruding beads 11 are arranged parallel to each other.

Referring back to FIG. 1, small flow channels 22 are defined between the respective battery cells 21 of the battery module 20 such that a coolant can flow through the flow channels 22. Consequently, the coolant, introduced through the coolant inlet port 2, flows through the flow channels 22. At this time, heat generated from the battery cells 21 is removed by the coolant. After that, the coolant is discharged outside through the coolant outlet port 4.

However, the flow of the coolant, introduced through the coolant inlet port 2, is greatly disturbed by the inwardly-protruding beads 11 formed at the battery pack case 10 adjacent to the coolant inlet port 2, with the result that it is difficult to achieve uniform coolant flux distribution to the battery cells 21. Specifically, the width of the upper duct 12 is temporarily reduced at the positions where the inwardly-protruding beads 11 are located. As a result, the flux of the coolant flowing through the flow channels defined between the battery cells 21 located below the inwardly-protruding beads 11 is considerably reduced, and therefore, the coolant is driven to the front of the inwardly-protruding beads 11.

Figure 3:
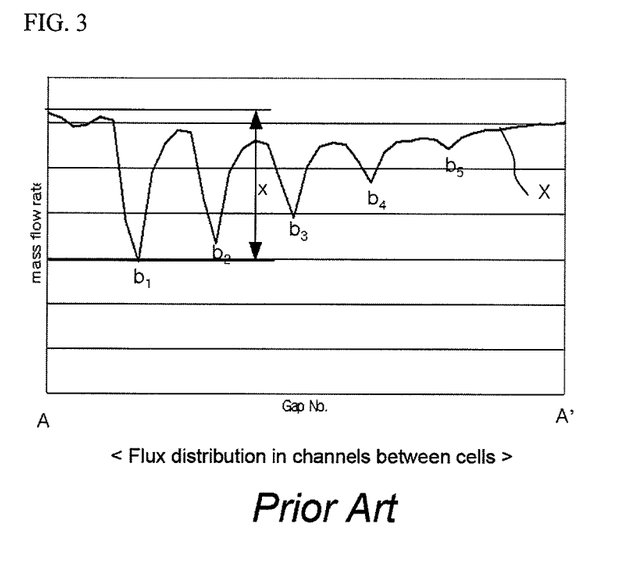
FIG. 3 is a graph illustrating the measurement results of coolant flux distribution between battery cells of the middle- or large-sized battery pack manufactured in the structure shown in FIG. 1.

FIG. 3 is a graph illustrating the measurement results of coolant flux distribution between battery cells of the middle- or large-sized battery pack manufactured in the structure shown in FIG. 1. It can be seen from the graph that the mass flow rate X of the coolant between the battery cells at the positions b1, b2, b3, b4, and b5 where the inwardly-protruding beads 11 of the battery pack case 10 are located is considerably reduced with the increase in distance from the coolant inlet port.

Eventually, the coolant is not uniformly supplied to the respective battery cells 21, and therefore, the temperature difference between the battery cells 21 greatly increases. Such great temperature difference is one of the main causes greatly lowering the overall performance of the battery pack.

As a technology for solving a problem caused by the non-uniform distribution of a coolant, a technology for changing the flow direction of the coolant by a plurality of rectification plates installed in a coolant channel is disclosed in Japanese Patent Application Publication No. 2005-116342. However, this technology has a problem in that a process for installing the rectification plates is added to a conventional manufacturing process, and therefore, the manufacturing costs are increased. Furthermore, the disclosed technology has another problem in that the flow of the coolant in the battery pack is disturbed by the rectification plates, and therefore, the average remaining time, for which the coolant, introduced through the coolant inlet port, is discharged outside through the coolant outlet port, increases, whereby the cooling effect deteriorates.

Consequently, there is a high necessity for a technology to fundamentally solve the above-mentioned problems.

SUMMARY OF THE INVENTION

Therefore, the present invention has been made to solve the above problems, and other technical problems that have yet to be resolved.

As a result of a variety of extensive and intensive studies and experiments on a middle- or large-sized battery pack case, the inventors of the present invention have found that, when beads formed at the battery pack case are constructed in an outwardly-protruding structure, the distribution uniformity of coolant flux is improved while the decrease of its structural stability against an external force is minimized, with the result that heat accumulating between battery cells is effectively removed, and therefore, the performance and life span of the battery cells are greatly improved. The present invention has been completed based on these findings.

In accordance with one aspect of the present invention, the above and other objects can be accomplished by the provision of a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the beads being constructed in an outwardly-protruding structure to allow the coolant to be uniformly introduced into the battery module from the coolant inlet port in the advancing direction of a fluid in a flow space ("inlet duct") defined between the coolant inlet port and the battery module.

When the concavo-convex shaped beads of the outwardly-protruding structure are formed at the outside of the inlet duct, the coolant may flow in whirls at the outwardly-protruding beads, with the result that the flow of the coolant in the duct may be partially disturbed. However, it has been confirmed that the partial disturbance of the coolant due to the whirls is much less than the distribution nonuniformity of the coolant caused by the inwardly-protruding beads as shown in FIG. 1; rather, the concentration of the coolant at the battery cells adjacent to the coolant inlet port is restrained.

Consequently, the middle- or large-sized battery pack case according to the present invention is capable of allowing the coolant to be uniformly introduced into the battery module through the coolant inlet port in the advancing direction of the coolant, while effectively maintaining the mechanical strength of the battery pack case, by the outwardly-protruding structure of the beads, thereby effectively removing heat generated during the charge and discharge of the battery cells through the uniform flow of the coolant, and therefore, improving the cooling efficiency and the performance of the battery.

The battery module, mounted in the middle- or large-sized battery pack case according to the present invention, is generally manufactured by a method of stacking a plurality of battery cells with high integration. At this time, the neighboring battery cells are stacked at predetermined intervals such that heat generated during the charge and discharge of the battery cells can be effectively removed. For example, the battery cells may be sequentially stacked such that the battery cells are spaced apart from each other at predetermined intervals without using additional members. When the battery cells have a low mechanical strength, on the other hand, one or several battery cells are mounted in a cartridge, and a plurality of cartridges are stacked to constitute a battery module. Consequently, coolant flow channels are defined between the respective battery cells such that heat accumulating between the stacked battery cells is effectively removed.

The beads are formed at the battery pack case such that the beads exhibit excellent durability or structural stability against an external force, such as twist or vibration. In a preferred embodiment, the beads are constructed in a concavo-convex structure having a large length to width ratio, and the beads are arranged parallel to each other.

Preferably, the beads have an outward height of 2 to 5 mm or equivalent to 10 to 30% of the vertical sectional height of the coolant inlet port such that the beads do not greatly disturb the flow of the coolant while securing durability and structural stability. More preferably, the beads have an outward height of 3 to 4 mm or equivalent to 15 to 25% of the vertical sectional height of the coolant inlet port. If the outward height of the beads is too small, the durability and structural stability are greatly reduced against an external force, such as twist or the vibration. If the outward height of the beads is too large, on the other hand, the beads disturb the flow of the coolant, with the result that the cooling efficiency of the battery pack lowers.

Experiments carried out by the inventors of the present invention revealed that, when the inlet duct is constructed in a structure in which the inlet duct has a vertical height equivalent to 55 to 80% of the vertical height of the outlet duct, the coolant flux flowing through the flow channels defined between the battery cells is more uniformly distributed. That is, when the inlet duct and the outlet duct have the same width, the flow speed of the coolant in the inlet duct is relatively increased with the decrease in height of the inlet duct, thereby preventing the concentration of the coolant between the battery cells near the coolant inlet port.

In a preferred embodiment in connection with the bead structure that does not disturb the flow of the coolant, the battery pack case is constructed in a structure in which the length of the battery pack case in the stacking direction of the battery cells is greater than the length of the battery pack case in the lateral direction of the battery cells, the beads are arranged parallel to the lateral direction of the battery cells, and the beads are not formed at a predetermined region of the inlet duct adjacent to the coolant inlet port.

The above-described bead structure is a structure in which the beads are not substantially formed at the region of the inlet duct adjacent to the coolant inlet port. The influence of the beads on the flow of the coolant is the greatest at the region of the inlet duct adjacent to the coolant inlet port. Consequently, when the beads are formed from a region of the inlet duct spaced a predetermined distance from the coolant inlet port, the influence of the beads on the flow of the coolant is minimized.

Preferably, the region where the beads are not formed has a length equivalent to 10 to 30% of the length of the inlet duct. If the length of the region where the beads are not formed is too small, the influence of the beads on the flow of the coolant is increased, and therefore, it is difficult to achieve a desired effect. If the length of the region where the beads are not formed is too large, on the other hand, the durability and structural stability of the entire battery pack case are reduced.

In another preferred embodiment, the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the outward height of the beads at a predetermined region of the inlet duct adjacent to the coolant inlet port is gradually decreased toward the coolant inlet port.

This structure includes a structure in which the outward height of the bead at the coolant inlet port side is relatively decreased, and the outward height of the beads is gradually increased as the beads become more remote from the coolant inlet port, or the outward height of the beads is gradually increased to a predetermined value, and then the original outward height of the beads is maintained from a specific bead, in order to minimize the decrease of the structural stability of the battery pack case and, at the same time, increase the distribution uniformity of coolant flux between the battery cells. In this case, the number of the beads the outward height of which is changed may be decided depending upon the degree of decrease of the structural strength of the battery pack case due to the height adjustment of the beads.

Preferably, the region where the outward height of the beads is gradually decreased has a length equivalent to 15 to 50% of the length of the inlet duct. If the length of the region where the outward height of the beads is gradually decreased is too small, the height of the beads is increased with a relatively large width in a narrow space, and therefore, it is difficult to achieve a desired effect. If the length of the region where the outward height of the beads is gradually decreased is too large, on the other hand, the durability and structural stability of the region where the outward height of the beads is gradually decreased are decreased over a wide range.

Preferably, the battery pack case is constructed in a structure in which a suction fan is mounted in the coolant outlet port for rapidly and smoothly moving the coolant, introduced through the coolant inlet port, to the coolant outlet port, such that the coolant is discharged out of the battery pack, after the coolant flows through the battery module.

Since the middle- or large-sized battery pack is characterized in that the battery pack is frequently exposed to external impacts, such as vehicles, the following structure may be considered as another embodiment for minimizing the influence of the beads on the flow of the coolant while the beads are formed on the inlet duct, in order to secure a specific structural strength of the battery pack.

Specifically, the present invention provides a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the interiors of the beads being filled with filling members or a plate-shaped member being mounted at the lower ends of the beads such that the flow of the coolant is not disturbed by the beads in the inlet duct.

Consequently, the bead region is flat at the bottom thereof by the filling members or the plate-shaped member, and therefore, the flow of the coolant is not affected by the beads.

In accordance with another aspect of the present invention, there is provided a middle- or large-sized battery pack constructed in a structure in which a battery module is mounted in the middle- or large-sized battery pack case with the above-stated construction.

The term "battery module" used in the specification inclusively means the structure of a battery system constructed in a structure in which two or more chargeable and dischargeable battery cells are mechanically and, at the same time, electrically connected with each other to provide high-power, large-capacity electricity. Therefore, the battery module itself may constitute a single apparatus or a part of the large-sized apparatus. For example, a plurality of small-sized battery modules are connected with each other to constitute a large-sized battery module.

Consequently, the battery module may include a plurality of plate-shaped battery cells that can be charged and discharged. In the specification, the term 'plate shape' means a shape having a relatively large length to width ratio, for example, a rectangular parallelepiped shape.

The battery cells may be secondary batteries, such as nickel metal hydride secondary batteries or lithium secondary batteries. Among them, the lithium secondary batteries are preferably used because the lithium secondary batteries have high energy density and high discharge voltage. Based on its shape, a prismatic battery or a pouch-shaped battery is preferably used as a chargeable and dischargeable unit cell constituting the battery module. More preferably, the pouch-shaped battery is used as the unit cell of the battery module because the pouch-shaped battery is manufactured with low manufacturing costs and light in weight.

The middle- or large-sized battery pack according to the present invention is preferably used as a power source for electric vehicles or hybrid electric vehicles, the safety of which may seriously deteriorate due to high-temperature heat generated from a plurality of battery cells combined to provide high power and large capacity, during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 4:
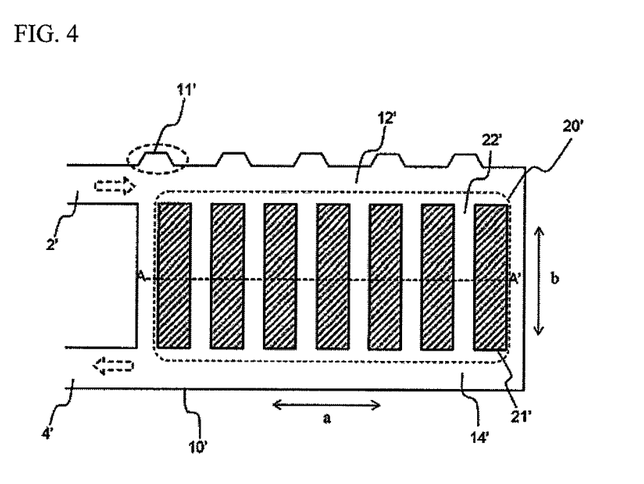
FIG. 4 is a sectional view typically illustrating a middle- or large-sized battery pack constructed in a structure in which a battery module is mounted in a battery pack case according to a preferred embodiment of the present invention.

FIG. 4 is a sectional view typically illustrating a middle- or large-sized battery pack constructed in a structure in which a battery module is mounted in a battery pack case according to a preferred embodiment of the present invention.

Referring to FIG. 4, the middle- or large-sized battery pack includes a battery module 20' constructed in a structure in which a plurality of plate-shaped battery cells 21' are electrically and mechanically connected with each other and a battery pack case 10' in which the battery module 20' is mounted.

The battery pack case 10' is constructed in a structure in which the length of the battery pack case 10' in the stacking direction a of the battery cells 21' is greater than the length of the battery pack case 10' in the lateral direction b of the battery cells 21'. Also, the battery pack case 10' has a coolant inlet port 2' and a coolant outlet port 4', which are disposed such that a coolant can flow from one side to the other side of the battery module 20' in the direction perpendicular to the stacking direction a of the battery cells 21'.

Small flow channels 22' are defined between the respective battery cells 21' of the battery module 20' such that the coolant can flow through the flow channels 22'. Consequently, the coolant, introduced through the coolant inlet port 2', flows through the flow channels 22'. At this time, heat generated from the battery cells 21' is removed by the coolant. After that, the coolant is discharged through the coolant outlet port 4'.

The battery pack case 10' according to this embodiment is different from the battery pack case 10 illustrated in FIG. 1 in that outwardly-protruding beads 11' are formed at the outside of the battery pack case 10' at a position where the inlet duct 12' is located. Since the outwardly-protruding beads 11' are located outside the inlet duct 12', the distribution uniformity of coolant flux is further improved as compared to the inwardly-protruding beads 11 of FIG. 1.

Figure 5:
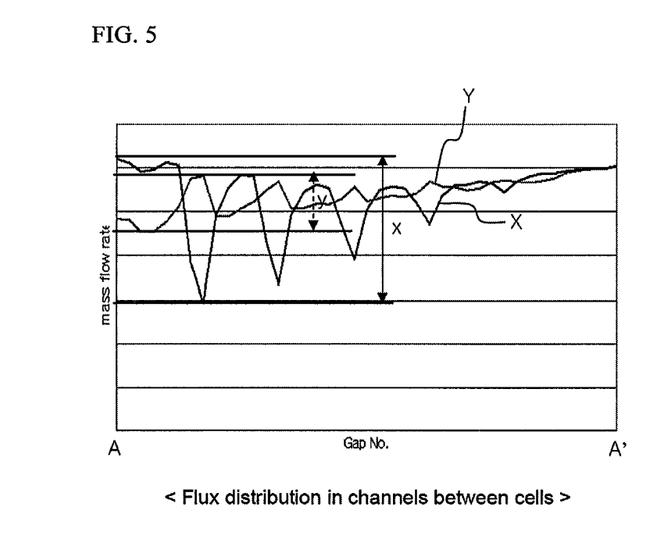
FIG. 5 is a graph illustrating the measurement results of coolant flux distribution between battery cells of the middle- or large-sized battery pack manufactured in the structure shown in FIG. 4.

In this regard, FIG. 5 is a graph illustrating the measurement results of coolant flux distribution between battery cells of the middle- or large-sized battery pack manufactured in the structure shown in FIG. 4. Specifically, both the measurement results X of coolant flux distribution in the middle- or large-sized battery pack of FIG. 1 and the measurement results Y of coolant flux distribution in the middle- or large-sized battery pack of FIG. 4 are illustrated in FIG. 5.

When comparing the coolant flux difference y of the Y with the coolant flux difference x of the X, the flow of the coolant at the battery cells adjacent to the coolant inlet port is not disturbed by the outwardly-protruding beads, whereby the coolant flux difference y of the Y is less than the coolant flux difference x of the X, and therefore, the distribution uniformity of coolant flux is improved.

Figure 6:
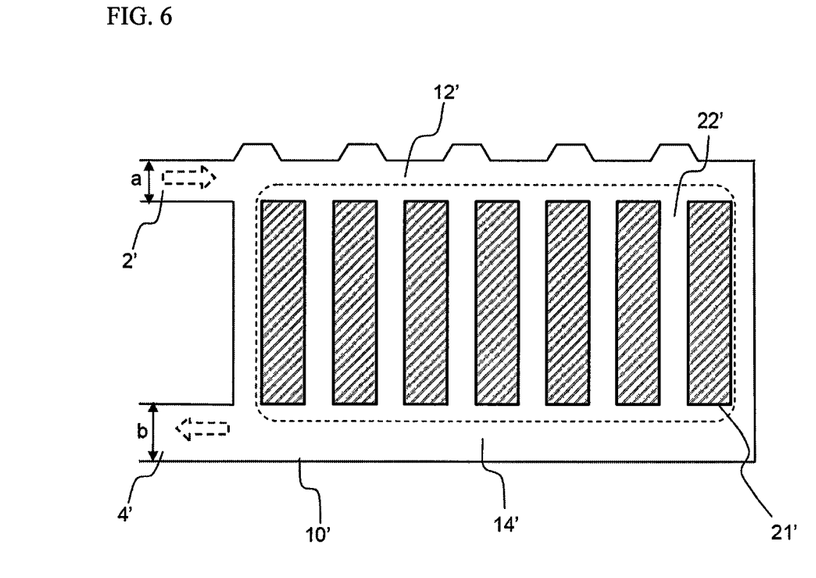
FIGS. 6 to 8 are sectional views typically illustrating middle- or large-sized battery packs constructed in a structure in which battery modules are mounted in battery pack cases according to other preferred embodiments of the present invention.
Figure 7:
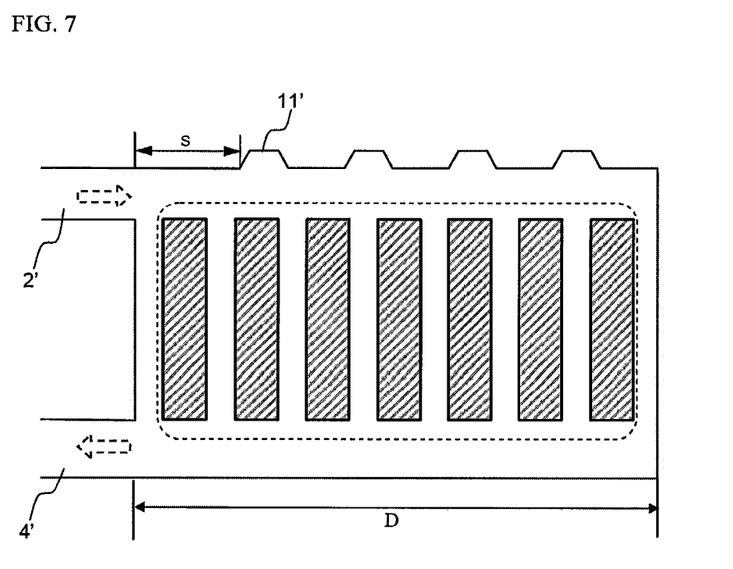
Figure 8:
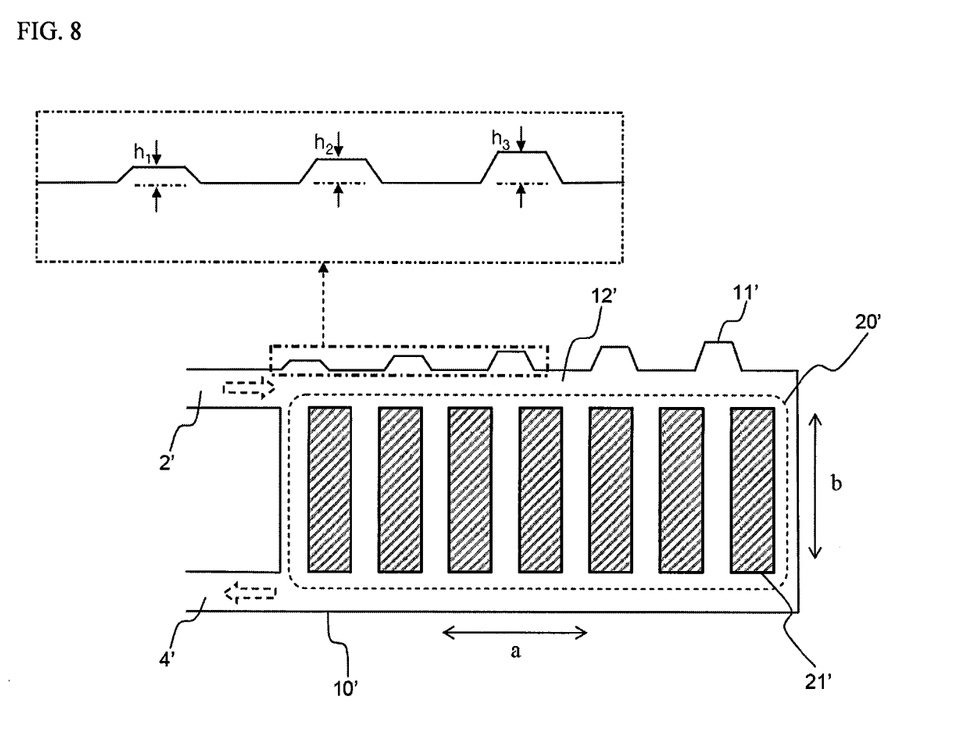

FIGS. 6 to 8 are sectional views typically illustrating middle- or large-sized battery packs constructed in a structure in which battery modules are mounted in battery pack cases according to other preferred embodiments of the present invention.

Referring first to FIG. 6, the inlet duct 12' has a vertical height a equivalent to approximately 65% of the vertical height b of the outlet duct 14', whereby the distribution of the coolant flux flowing through the flow channels 22' defined between the battery cells 21' is very uniformalized.

Referring next to FIG. 7, outwardly-protruding beads 11' are not formed at a predetermined region s adjacent to the coolant inlet port within approximately 25% of the length D of the inlet duct. Consequently, the distribution of the coolant flux flowing through the flow channels defined between the battery cells corresponding to the region s is not affected by the outwardly-protruding beads 11'.

Referring finally to FIG. 8, the battery pack case 10' is constructed in a structure in which the length of the battery pack case 10' in the stacking direction a of the battery cells is greater than the length of the battery pack case 10' in the lateral direction b of the battery cells, outwardly-protruding beads 11' are formed at the battery pack case 10' such that the outwardly-protruding beads 11' are arranged parallel to the lateral direction b of the battery cells, and the outwardly-protruding height of the outwardly-protruding beads 11' at a predetermined region of the inlet duct 12' adjacent to the coolant inlet port 2' is gradually decreased toward the coolant inlet port 2' ($h_1 < h_2 < h_3$). This bead structure further improves the distribution uniformity of coolant flux.

Figure 9:
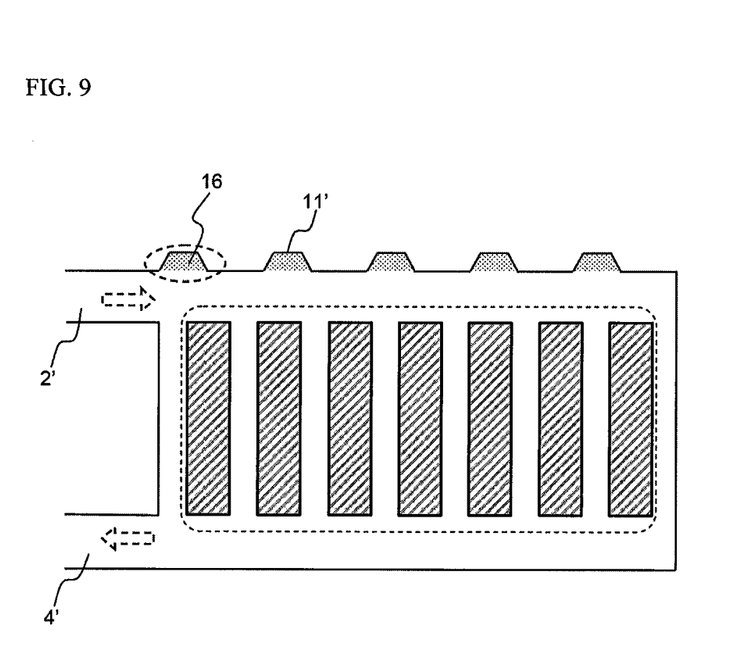
FIGS. 9 and 10 are sectional views typically illustrating middle- or large-sized battery packs constructed in a structure in which battery modules are mounted in battery pack cases according to modifications of the present invention.
Figure 10:
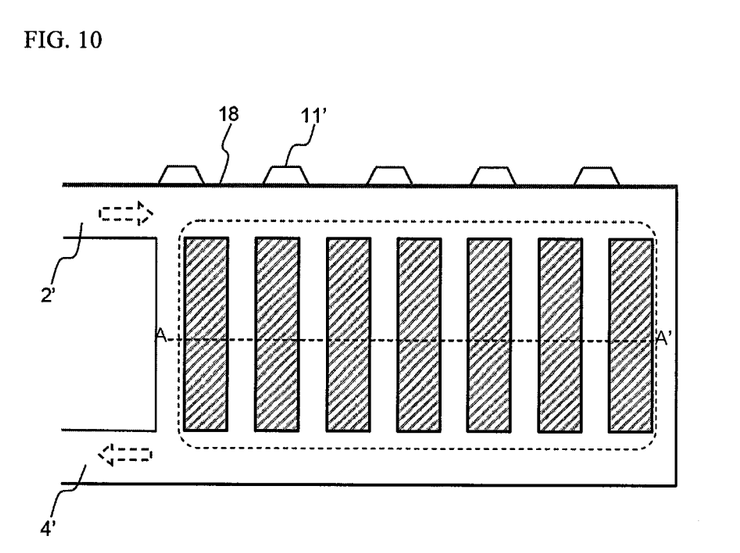

FIGS. 9 and 10 are sectional views typically illustrating middle- or large-sized battery packs constructed in a structure in which battery modules are mounted in battery pack cases according to modifications of the present invention.

Referring to these drawings, the interiors of the outwardly-protruding beads 11' are filled with filling members 16 as shown in FIG. 9, and a plate-shaped member 18 is mounted at the lower ends of the outwardly-protruding beads 11' as shown in FIG. 10. Consequently, the flow of the coolant is not affected by the outwardly-protruding beads 11'.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the middle- or large-sized battery pack case according to the present invention is capable of improving the distribution uniformity of coolant flux while securing its structural stability against an external force. Consequently, the middle- or large-sized battery pack case according to the present invention has the effect of effectively removing heat accumulating between the battery cells, and therefore, greatly improving the performance and life span of the battery cells.

What is claimed is:

1. A middle- or large-sized battery pack case in which a battery module having a plurality of stacked battery cells, which can be charged and discharged, is mounted, wherein
the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the beads being constructed in an outwardly-protruding structure to allow the coolant to be uniformly introduced into the battery module from the coolant inlet port in the advancing direction of a fluid in an inlet duct defined between the coolant inlet port and the battery module.

2. The middle- or large-sized battery pack case according to claim 1, wherein the beads are constructed in a concavo-convex structure having a large length to width ratio, and the beads are arranged parallel to each other.

3. The middle- or large-sized battery pack case according to claim 1, wherein the beads have an outward height of 2 to 5 mm or equivalent to 10 to 30% of the vertical sectional height of the coolant inlet port.

4. The middle- or large-sized battery pack case according to claim 1, wherein the beads have an outward height of 3 to 4 mm or equivalent to 15 to 25% of the vertical sectional height of the coolant inlet port.

5. The middle- or large-sized battery pack case according to claim 1, wherein the inlet duct has a vertical height equivalent to 55 to 80% of the vertical height of an outlet duct.

6. The middle- or large-sized battery pack case according to claim 1, wherein the battery pack case is constructed in a structure in which the length of the battery pack case in the stacking direction of the battery cells is greater than the length of the battery pack case in the lateral direction of the battery cells, the beads are arranged parallel to the lateral direction of the battery cells, and the beads are not formed at a predetermined region of the inlet duct adjacent to the coolant inlet port.

7. The middle- or large-sized battery pack case according to claim 6, wherein the region where the beads are not formed has a length equivalent to 10 to 30% of the length of the inlet duct.

8. The middle- or large-sized battery pack case according to claim 1, wherein the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the outward height of the beads at a predetermined region of the inlet duct adjacent to the coolant inlet port is gradually decreased toward the coolant inlet port.

9. The middle- or large-sized battery pack case according to claim 8, wherein the region where the outward height of the beads is gradually decreased has a length equivalent to 15 to 50% of the length of the inlet duct.

10. The middle- or large-sized battery pack case according to claim 1, wherein the battery pack case is constructed in a structure in which a suction fan is mounted in the coolant outlet port for forcibly moving the coolant, introduced through the coolant inlet port, to the coolant outlet port, after the coolant flows through the battery module.

11. A middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the interiors of the beads being filled with filling members or a plate-shaped member being mounted at the lower ends of the beads such that the flow of the coolant is not disturbed by the beads in the inlet duct.

12. A middle- or large-sized battery pack constructed in a structure in which a battery module is mounted in a middle- or large-sized battery pack case according to claim 1.

13. The middle- or large-sized battery pack according to claim 12, wherein the battery module includes a plurality of plate-shaped battery cells that can be charged and discharged.

14. The middle- or large-sized battery pack according to claim 13, wherein the battery cells are lithium secondary batteries.

15. A middle- or large-sized battery pack constructed in a structure in which a battery module is mounted in a middle- or large-sized battery pack case according to claim 11.

16. The middle- or large-sized battery pack according to claim 15, wherein the battery module includes a plurality of plate-shaped battery cells that can be charged and discharged.

17. The middle- or large-sized battery pack according to claim 16, wherein the battery cells are lithium secondary batteries.

* * * * *